United States Patent [19]

Ridout et al.

[11] 4,011,405
[45] Mar. 8, 1977

[54] DIGITAL DATA TRANSMISSION SYSTEMS

[75] Inventors: Philip Neale Ridout, Elstree; Ian Bruce Ridout, Thornton Heath, both of England

[73] Assignee: The Post Office, London, England

[22] Filed: Mar. 5, 1975

[21] Appl. No.: 555,571

[30] Foreign Application Priority Data

May 17, 1974 United Kingdom ............. 22038/74

[52] U.S. Cl. ............................... 178/68; 325/38 A
[51] Int. Cl.² ........................................ H04L 27/02
[58] Field of Search ................ 178/68, 69 R, 69 N; 325/38 R, 40, 41, 42, 65, 38 A

[56] References Cited

UNITED STATES PATENTS

| | | | |
|---|---|---|---|
| 3,274,582 | 9/1966 | Gibson | 340/347 DD |
| 3,502,986 | 3/1970 | Lucky | 325/41 X |

*Primary Examiner*—Benedict V. Safourek
*Attorney, Agent, or Firm*—Hall & Houghton

[57] ABSTRACT

In a multiple response digital data transmission system the signal processing, which results in the generation of a plurality of time spaced pulses from each signal element and the superimposition of those pulses which occur simultaneously, is carried out in the receiver, possibly after demodulation. The signal processing may be performed by a transversal filter having circuits connected to tappings of a delay line, which circuits have gains chosen in accordance with the desired multiple response characteristics. The transversal filter may include additional circuits which are adaptive and controlled in response to the departure of the levels of the superimposed pulses from reference levels to correct for signal distortions arising during transmission. The transmitted data may be precoded in dependence upon the multiple response characteristics used so that relatively little processing is required after transmission through the system to restore the data to its original form.

11 Claims, 7 Drawing Figures

DIGITAL DATA TRANSMISSION SYSTEMS

This invention relates to digital data transmission systems, and in particular to such systems using "multiple response" techniques, in which each input signal element is arranged to produce output signal elements at more than one discrete instant. Such techniques have been proposed and employed in data transmission modems where maximum utilisation of the available bandwidth is required, because they permit control over the spectral sensitivity of the system by allowing specific interference between symbols to occur so that distortion at the edges of the band can be tolerated.

In one example of a "multiple response" system, each input signal element results in equal and opposite outputs spaced by two unit intervals, each equal to the spacing between adjacent input signal elements; such a system can be described as $(1, 0, -1)$.

Since in these systems, responses due to more than one element are received at each significant instant and are therefore superimposed, the output signal comprises more levels than the input data and it is easily interpreted as a digital signal only when the responses due to a single element have amplitudes with simple integral relationships as from their transmission to the output over respective paths having gains related by small integers. The greater the number of responses, the greater is the number of levels in the output signal, although the number of bits carried per element is unchanged. Consequently, there are attendant penalties in noisy signal performance and in the need for waveform accuracy. However, valuable spectral control properties can be obtained from systems employing only two responses such as the above example. Other examples of dual-response systems are duobinary $(1,1)$ and bipolar or alternate mark inversion $(1,-1)$.

A three-level output signal results from a binary input with any equal-amplitude dual-response system such as mentioned above. The levels correspond to cancellation of the two responses (which are due to different input digits) or to their addition in either polarity.

To ease interpretation of the output signal of a multiple-response system and to avoid error-extension problems which would be inherent in the use of decoding techniques at the receiver, it is usual to precode the transmitted data stream.

For example, the operation of the 1, 0, −1 system at an inspection instant is represented by the equation $$c_J = b_J - b_{J-2} \tag{1}$$

where
$b_J =$ the Jth transmitted digit
$c_J =$ the Jth received digit

If, however, the transmitted digits are precoded as follows:

$$b_J = b_{J-2} \theta a_J \tag{2}$$

where
$a_J =$ the Jth source data digit and
$\theta$ means add modulo-2
then $$a_J = c_J \text{ modulo } 2 \tag{3}$$

This leads to the simple result in the binary case, that the center level of the output sequence represents a 0 in the source data, while either outer level represents a 1.

Apart from the pre-coder, the multiple response process is a linear one and hence multilevel signals may be transmitted in any dual-response case (with equal amplitude responses), an $m$-level input gives rise to an output signal with $2m-1$ levels. The precoding required for $m$-level operation is again found to be that represented by the equation set out above except that modulo-$m$ addition must be performed instead of modulo 2. The output signal then represents the source data directly in a modulo-$m$ scale and is readily converted back to $m$-level form by subtracting $m$ levels from all signals having amplitudes greater than $m-1$.

It is an object of the invention to provide a data transmission system using multiple response techniques.

According to one aspect of the present invention there is provided a digital data transmission system having at least one transmitter and at least one receiver, in which system each signal element is arranged to produce, during transmission by the system, output elements at more than one discrete instant spaced apartly an integral number of the time intervals between adjacent signal elements, so that output elements from different signal elements are produced simultaneously and superimposed, wherein only in the or each receiver are the signal elements changed to the output signal elements at more than one discrete instant and superimposed.

According to a second aspect of the invention there is provided a receiver for digital data including a network through which incoming signal elements are passed before or after demodulation, which network produces at least two output elements spaced apart by an integral number of the time intervals between adjacent incoming signal elements for each signal element received and combines simultaneously occurring output elements to produce a composite output signal. In a preferred embodiment the network follows the demodulator.

The digital data may be precoded to suit the multiple-response mode chosen. The output of the demodulator is applied to a network having the desired multiple response characteristic, which produces an output from the precoded data representing the original data directly in a modulo-$m$ scale as described above. The network itself may be, for example, an analogue transversal filter having tappings on a delay line spaced at unit intervals of the original data and tapping coefficients corresponding to the particular multiple response mode. The network may be constructed so as to have adaptive tappings additional to the fixed reference tappings corresponding to the particular multiple response mode, the adaptive tappings serving to compensate for distortions of the signal arising during transmission and reception.

In order that the invention may be fully understood and readily carried into effect, it will now be described with reference to the accompanying drawings, of which:

Figure 1:
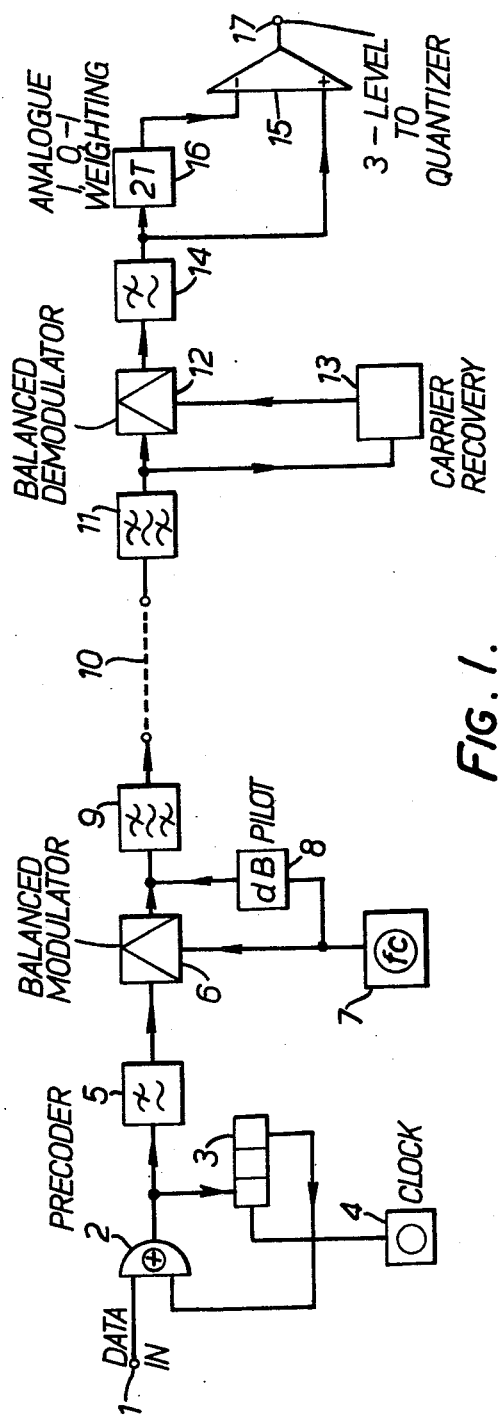
FIG. 1 is a block diagram of a data transmission system according to one example of the invention.

Referring now to FIG. 1, incoming data in serial binary digital form to be transmitted enters the system at a terminal 1 from which it is applied to an input of a modulo-2 adder 2. The output of the modulo-2 adder 2 is connected to the first stage of a three-stage shifting register 3 through which data is shifted under the control of a clock 4. The clock 4 is synchronised with the incoming data, by means not shown in the drawing but which can take any suitable form, so that the rate of shifting digits through the register 3 is equal to the digit rate of the incoming data. The last stage of the register 3 is connected to a second input of the modulo-2 adder 2.

The output of the adder 2 is also connected through a low pass filter 5 to an input of a balanced modulator 6 where it is used to molulate a carrier wave $f_c$ generated by a generator 7. To provide a reference pilot signal for demodulation a small proportion of unmodulated carrier is added to the output of the modulator 6 via a fixed attenuator 8, and the combined signal is passed through a band pass filter 9 to convert it into vestigial sideband form in the usual way. The transmission itself is represented by the dotted line 10 and may be radio transmission or along waveguides or cables, for example.

After transmission the signal is selected by a filter 11, since the transmission medium may be carrying other signals, and then applied to a balanced demodulator 12, to which an unmodulated carrier $f_c$ is applied after recovery from the received pilot signal by a unit 13. A low-pass filter 14 passes the pulse signals produced by demodulation of the received signals to one input of an analogue subtractor 15 directly and to a second input of the subtractor 15 through a delay element 16, which imposes a delay of two digit periods on the signals. The output signals from the subtractor 15 appear at a terminal 17 in three-level form and are applied to a quantizer, not shown, for correcting departures from the correct signal levels, arising from the transmission and processing, for example.

In the operation of the system shown in FIG. 1, the adder 2 and shifting register 3 serve to precode the incoming data in the manner described above for a (1,0,−1) dual-response system. Because the adder 2 operates in modulo-2 arithmetic its output signal can only have the value 0 or 1. Thus the effect of the precoding on the incoming data which is in serial binary form, is to produce a binary output signal, but one which differs from the incoming data. It will, however, be apparent that the precoded signal is no more difficult to transmit than the original data, because no additional signal levels are introduced. The production of a vestigial sideband modulated carrier wave is straightforward, as is the demodulation of this signal, and consequently no detailed description of these operations will be given. The demodulated signal is subjected to multiple response processing according to a (1,0,−1) system by the circuit formed by the subtractor 15 and the delay element 16, which because of the precoding produces a three-level signal in which a 0 of the original data is reproduced as a center level in the three-level signal, a 1 of the original data is reproduced as −1 or a +1 as has already been indicated by equation (3). The three-level signal, before or after quantizing to re-establish the correct signal levels, may readily be restored to the original binary form by the use of a circuit which produces reflection in the zero voltage level employing, for example, an inverter which is disabled for positive signal values and enabled for negative ones.

Figure 2:
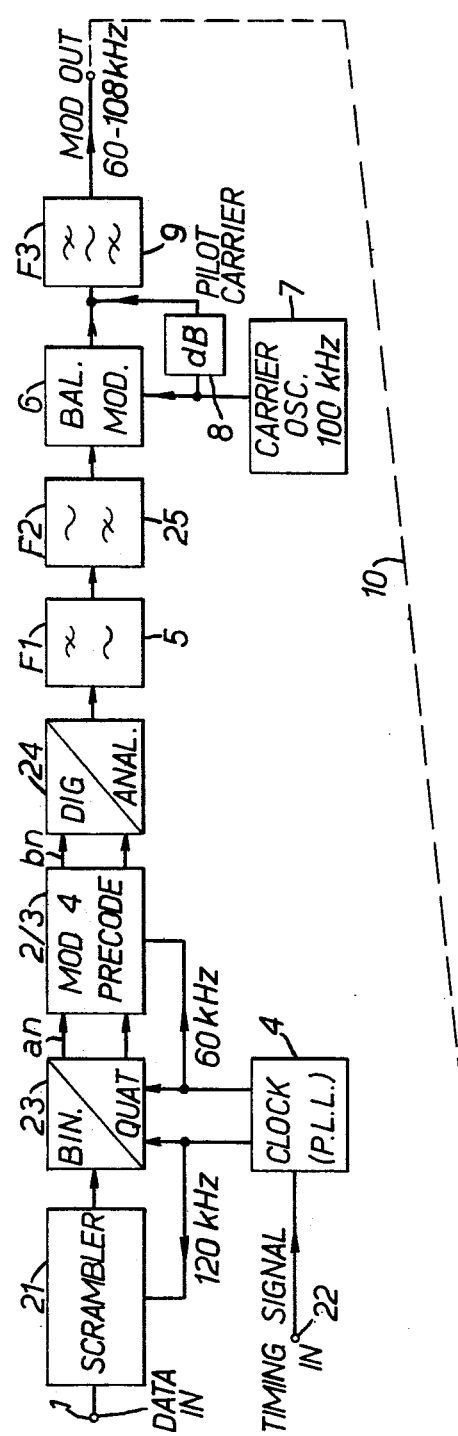
FIG. 2 is a block diagram showing a system similar to that of FIG. 1, in more detail.
Figure 2:
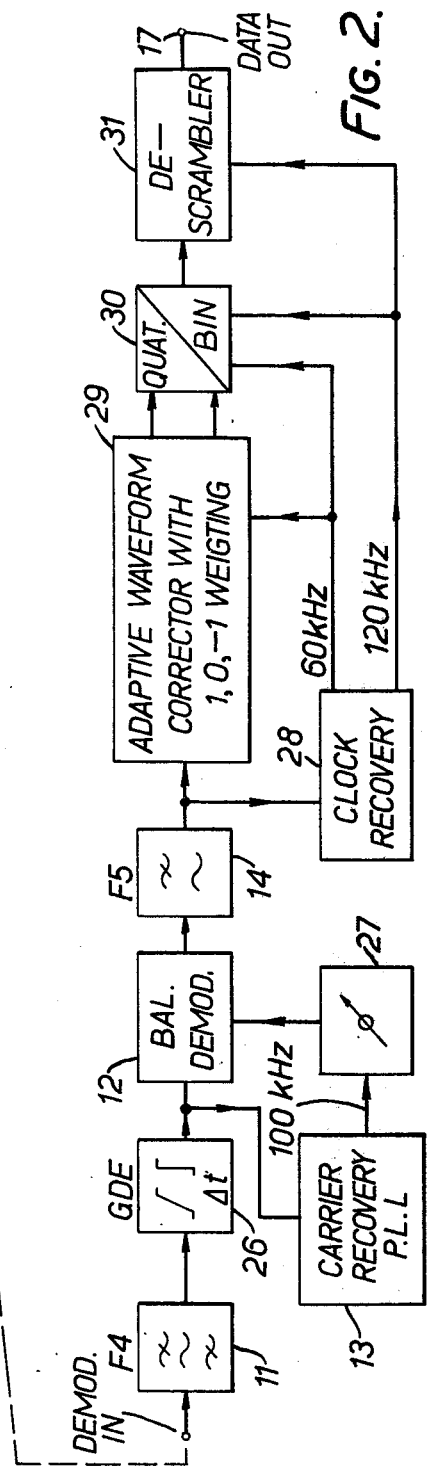

FIG. 2 shows in more detail a system similar to that of FIG. 1 and to facilitate the understanding of FIG. 2 the components which correspond to components of FIG. 1 carry the same reference numbers as in that Figure. Amongst the difference from the FIG. 1 system which are incorporated in FIG. 2 are the use of a scrambler and de-scrambler, the conversion of the incoming binary signal into quaternary form and its subsequent reconversion to binary form, and the incorporation of the multiple-response processing within an adaptive waveform corrector. As in the FIG. 1 system a (1,0,−1) dual-response system is employed in FIG. 2, but it will be appreciated that other mulitple-response systems could be employed in either Figure with suitable modifications. FIG. 2 will be described with reference to specific signal frequencies but these are by way of example only.

Referring now to FIG. 2, the incoming binary data enters at terminal 1 and is scrambled by unit 21 under the control of a 120 kHz clock signal from oscillator 4. The oscillator 4 is synchronised with the incoming data by means of a timing signal fed to it via a terminal 22. In addition to the 120 kHz clock signal, the oscillator 4 also produces a 60 kHz clock signal and both of these clock signals are applied to a binary to quaternary converter 23 to control the timing of the conversion of the binary (two-level) signal at a digit rate of 120 kbit/s to a quaternary (four-level) signal at a digit rate of 60 kbaud. The four quaternary levels are encoded in 2-bit parallel binary form according to a Gray code. The quaternary signal is applied to a precoder 2/3 which may be of similar construction to the precoder of FIG. 1 and consist of a 2-bit digital adder interconnected with two three-stage shifting registers, one for each binary digit. Not only must the precoder differ from that of FIG. 1 as just described but also the 2-bit digital adder must operate according to modulo 4. The two three-stage shifting registers of the precoder are clocked at 60 kHz by the clock 4.

The 2-bit parallel digital output of the precoder 2/3 is converted into 4-level analogue form by a digital to analogue converter 24, the four levels having relative amplitudes of +3, +1, −1 and −3. From the converter the signal is applied via two filters 5 and 25 to a balanced modulator 6. The filter 5 is a low-pass filter having a cut-off frequency of about 45 kHz and is provided to band limit the signal applied to the modulator to prevent the occurrence of interfering components in the band 60 − 108 kHz due to fold-over or signal breakthrough. The filter 25 is a high-pass filter having a cut-off of 1 kHz to remove d.c. and prevent very low frequency components of the data signal reaching the modulator and interfering with the pilot carrier. In the balanced modulator 6 the data signal is modulated on a 100 kHz carrier from an oscillator 7, a proportion of the carrier is added to the output of the modulator and a vestigial sideband modulated signal is formed when passed through the band-pass filter 9 as previously described. The filter 9 passes the lower sideband and a vestige of the upper sideband, and is designed to provide at least 55 dB attenuation of signals outside the band 60 − 108 kHz to avoid interfering with adjacent signals.

After transmission over the medium 10 the signal is applied to the balanced demodulator 12 after passing through a band-pass filter 11 and a group delay equaliser 26. The filter 11 may be of the same design as the filter 9. To achieve correct vistigial sideband operation the filters 9 and 11 should when connected in tandem provide a transmission characteristic having odd symmetry about the carrier frequency. In a single-response system such correct operation of the vestigial sideband system is important, but since a dual-response system operating in the mode (1,0,−1) is insensitive to distortion near the carrier frequency, the tolerance can be relaxed provided that the vestigial sideband is narrow. The group delay equaliser is provided to reduce the delay distortion of the system arising from the steep cut-offs of the filters 9 and 11, and again because of the properties of 1,0,−1 transmission the accuracy of equalisation can be relaxed at the band edges.

The received signal from the equaliser 26 is applied to a balanced demodulator 12 and to a carrier recovery circuit 13, incorporating a phase locked loop. The 100 kHz carrier recovered by the circuit is applied as reference to the balanced demodulator 12 through a phase adjusting circuit 27, permitting the manual optimization of the carrier phase. It is possible as an alternative to make the carrier phase adjustment adaptive. A low-pass filter 14 allows the modulation to pass but stops residual carrier leakage and any unwanted demodulation components; it also assists in defining the bandwidth of the receiver.

Up to this point the signal remains in quaternary single-response form and for minimum intersymbol interference, the usual rules for the design of the baseband-baseband transmission characteristic apply. If non-return-to-zero signals are employed, compensation for the sin $\pi fT/\pi fT$ spectrum must be incorporated and the roll-off characteristic should be such that the spectrum at the output of the filter 14 resulting from a single input element pulse, has odd symmetry on a linear amplitude scale about the Nyquist frequency 1/2T Hz (30 kHz in the present example). Once again, however, since the system uses 1,0,−1 transmission, which is insensitive to distortion near the Nyquist frequency, the accuracy of this roll-off characteristic is much less critical than it would be in a system operating in single-response mode. To minimise the group-delay distortion arising in filters 9 and 11, it is desirable that these filters should be allowed to generate the roll-off characteristic.

A conventional clock recovery circuit 28, using early and late transitions of the single-response signal at the output of the filter 14 to control the phase of the timing signals, is employed. These are derived by division from a crystal oscillator operating at a multiple of the modulation rate and since the data signal is randomized, only transitions of a central slicing level need be used. A very stable timing signal is required to sample the final 7-level (1,0,−1) signal, so the increments of phase should be small ( > 1%) and, to take account of the wide dispersion of the transitions in a severely band-limited system, the circuit should be arranged to adjust the phase only when the excess of early or late transitions exceeds, say, eight. The clock 28 produces outputs at 60 KHz and 120 KHz.

A combined adaptive waveform corrector and 1,0,−1 weighting circuit 29, which will be described in more detail with reference to FIG. 3, accepts the distorted quaternary output from the filter 14, converts it to waveform-corrected 7-level form and gives a regenerated quaternary output. Quaternary/binary conversion and descrambling in units 30 and 31 respectively follow to provide the 120 kbit/s serial binary data output at terminal 17.

The operation of the circuit of FIG. 2 is basically the same as that of FIG. 1 except that, because the signal is of quaternary from, after (1,0,−1) weighting in the waveform corrector 29 the signal has seven levels and its conversion back to quaternary form is based on congruence (modulo 4).

Figure 3:
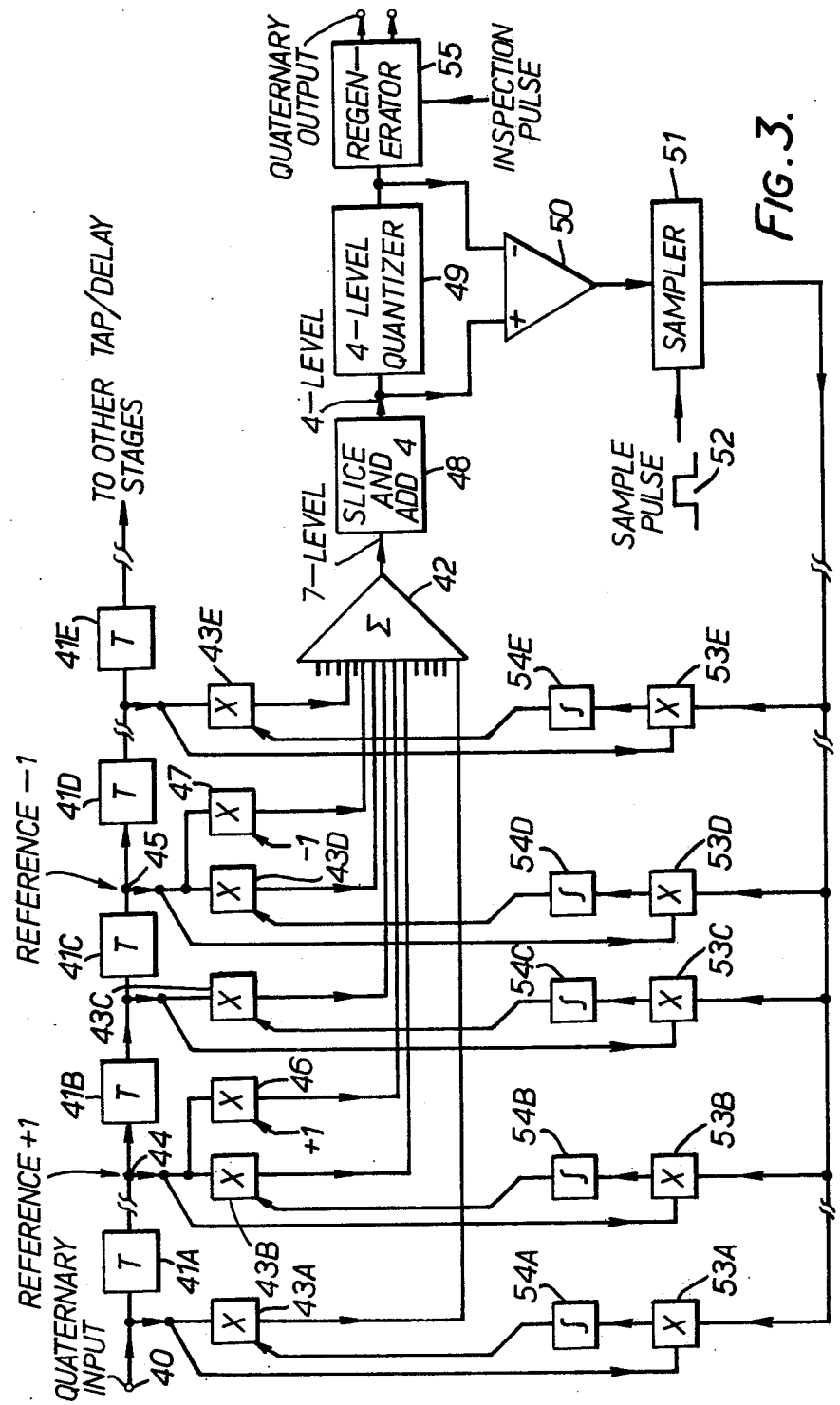
FIG. 3 shows the adaptive waveform corrector of the system of FIG. 2 in greater detail.

A block schematic diagram of the 1,0,−1 weighted adaptive waveform corrector 29 is shown in FIG. 3. The quaternary input signal from the filter 14 is applied to a terminal 40 and travels along a delay line constituted by delay elements 41A, 41B, 41C, etc. and having taps, spaced at intervals of 16.66 $\mu$S (the data signal digit interval), which are connected to a summing amplifier 42 via respective tap attenuators 43A, 43B, 43C, etc., which can be electronically controlled so that the contribution of any tap can have any coefficient between ± 1. In addition, two of the taps 44 and 45 near the center of the delay line and separately by two intervals, are additionally connected to the summing amplifier via respective fixed attenuators 46 and 47 so that they have coefficients of +1 and −1 respectively. Thus, with all the variable attenuators set to make zero contributions, the configuration is equivalent to that depicted in FIG. 1 and a 7-level (1,0,−1) signal will be generated at the output of the summing amplifier 42.

Figure 5:
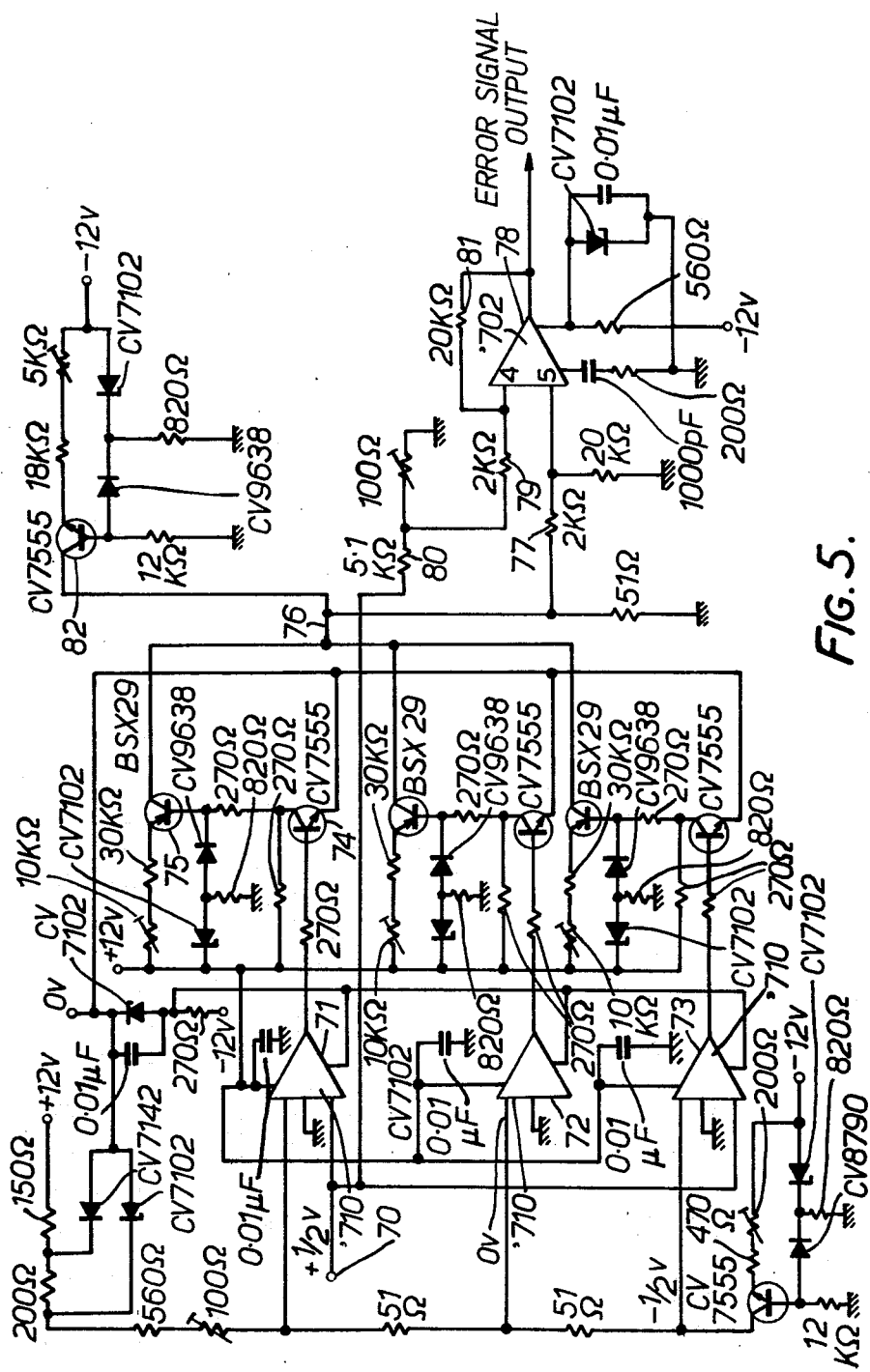
Figure 6:
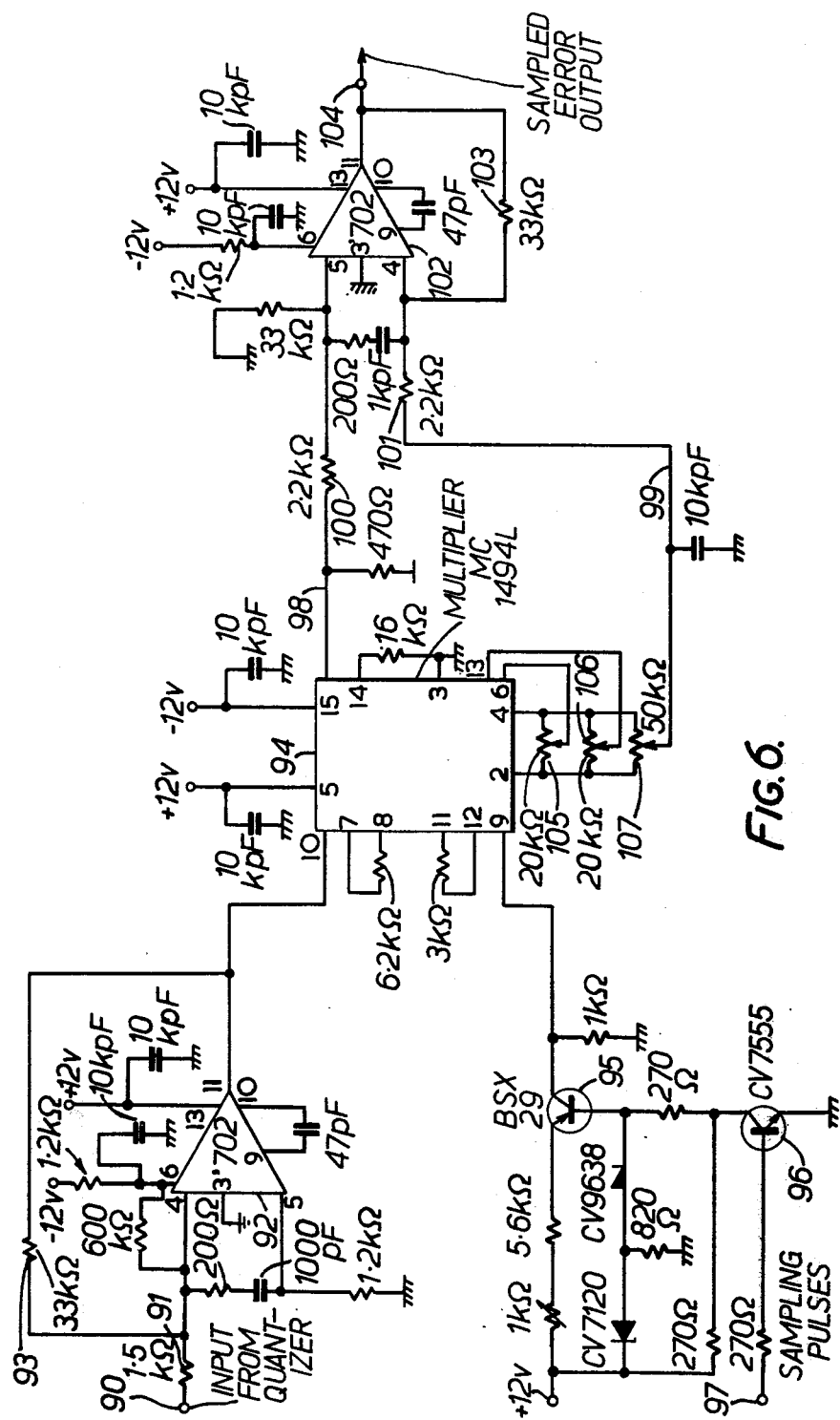

The 7-level signal from the amplifier 42 is then quantized in two stages. In the first stage it is converted back to a quaternary signal by a slice-and-add circuit 48 which adds four levels to all signals having values more negative than half a level negative relative to zero, thus observing the congruence (modulo 4) and converting the 7-level signal to a 4-level one. This quaternary signal, which corresponds to the signal at the input to the pre-coder (2/3 of FIG. 2) in the transmitter, is applied to a four-level quantizer 49 and error signal comparator 50. The output of the error signal comparator 50 represents the difference between the actual value of the quaternary signal and the value of the nearest permitted quantized level from the quantizer 49 at all times. This error output signal is expected to be near zero at the center of the data signal digit interval and it is gated or sampled in a sampler 51 at these times by pulses 52 timed by the 60 kHz timing signal to form a sampled error signal. The width of the error sample should ideally be small compared with that of the data signal digit interval. A pre-set control may be provided to optimize the epoch of the sample. The circuit diagram of the complete quantizer and error signal generator of FIG. 3 is shown in FIGS. 4, 5 and 6.

The taps on the delay line constituted by the elements 41A, 41B, 41C, etc. are connected to one input of respective linear/linear multiplier circuits 53A, 53B, 53C, etc. which have the sampled error signal from the sampler 51 applied to the other input. The outputs of the multipliers 53 are connected to respective integrator circuits 54A, 54B, 54C, etc., and the multiplier-integrator combinations give outputs proportional to the correlation between the sampled error signal and the respective tap signals. The correlation should be zero in the absence of intersymbol interference (or amplitude error in the case of the reference taps). The outputs of the integrators 54 are connected to the controls of the corresponding tap attenuators 43 so that, in the presence of distortion, contributions are introduced which tend to reduce any correlation found to be present at each tap. The amplitude of the sampled error signal is, therefore, driven towards zero on an adaptive basis and the response of the waveform corrector is optimized.

The output of the quaternary quantizing circuit 49 is regenerated by unit 55 at a time corresponding to the center of the error sample and is passed on to the quaternary/binary converter 30 (FIG. 2) in parallel form.

Figure 4:
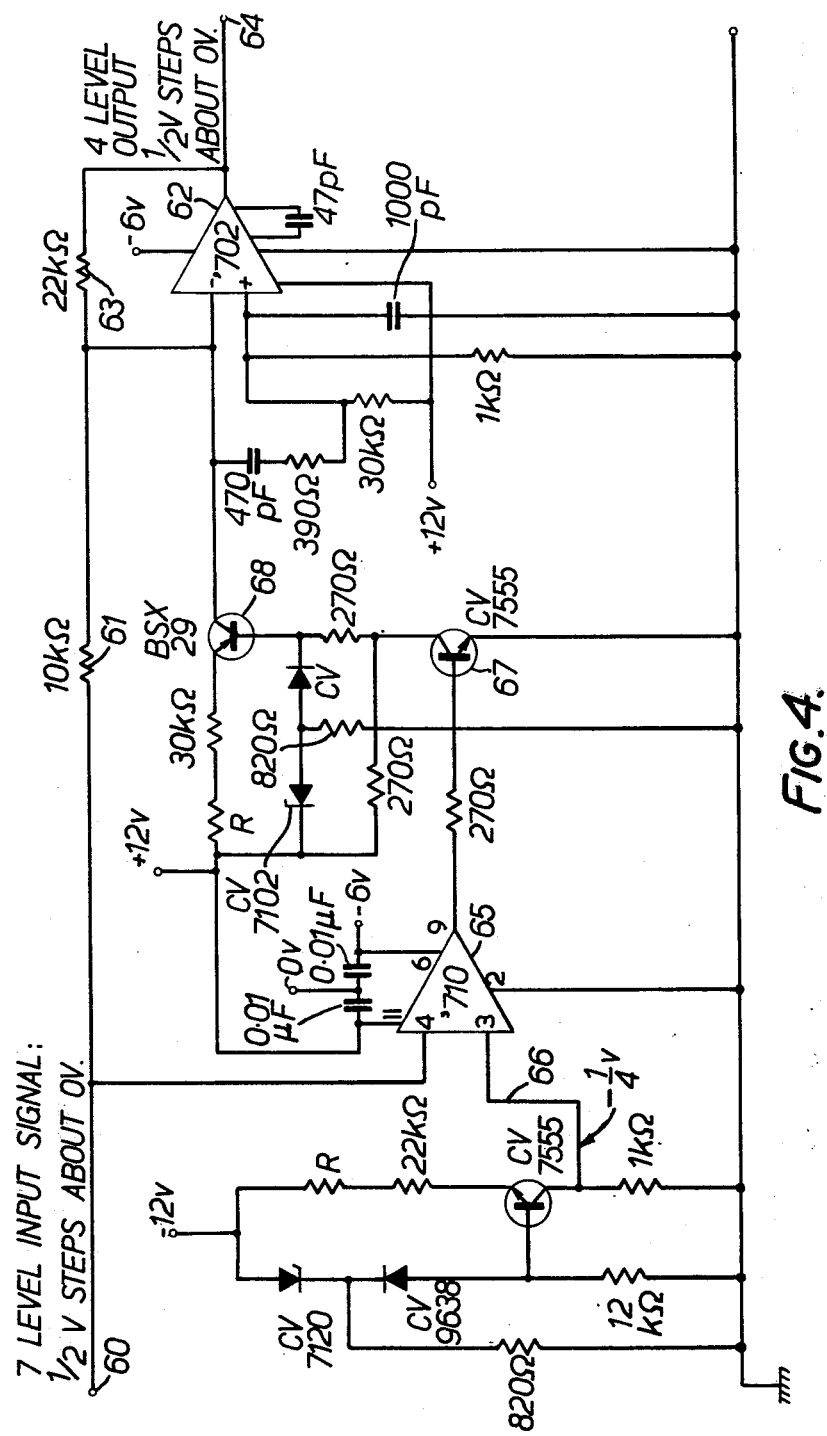
FIGS. 4, 5, 6 and 7 are detailed circuit diagrams of the corrector of FIG. 3.

FIG. 4 shows one example of a circuit for the unit 48 of FIG. 3 which adds four voltage levels to all signals more negative than minus one-half voltage level. The 7-level input signal is applied to a terminal 60 and is connected through a resistor 61 to the inverting input of an amplifier 62 having a feedback resistor 63. The 4-level output of the circuit is taken from a terminal 64 connected to the output of the amplifier 62. The amplifier 62 operates as a normal analogue summing amplifier and for the four more positive of the seven input levels has no other input, so that the uppermost four levels of the input signal appear at the output terminal 64. The input terminal 60 is, however, connected to a voltage comparator 65 in which the input signal level is compared with a reference level applied via a conductor 66 so that when the input signal level is more negative than one quarter of a volt, corresponding to minus one-half level, the comparator 65 produces a positive output which is applied to the base of a transistor 67 causing it to conduct. When the transistor 67 conducts it switches on a second transistor 68 through which a current corresponding to four signal levels flows to the input of the amplifier 62, so that the three lowermost levels of the input are made more positive by four levels when they appear at the output terminal 64.

FIG. 5 shows in detail the circuit diagram of the 4-level quantizer 49 of FIG. 3. The 4-level signal from the circuit 48 is applied to a terminal 70 in FIG. 5 and from thence is fed to the input of three comparators 71, 72 and 73. The comparators 71, 72 and 73 have additional inputs corresponding to the three voltage levels respectively lying midway between adjacent pairs of the four quantizing levels. Each of the comparators 71, 72 and 73 is connected to a similar circuit and the following description relates to comparator 71. The output of the comparator 71 is connected to the base of a transistor 74 to render this transistor conducting whenever the comparator 71 has a positive output which will be the case when the input voltage lies above the midway voltage level applied to the comparator 71, that is to say greater than plus one-half volt. The collector of the transistor 74 is connected to the base of a transistor 75 which is received conducting when the transistor rendered conducts so that a current flows from the collector of the transistor 75 to a conductor 76. The conductor 76 is connected through a resistor 77 to the non-inverting input of an amplifier 78, the inverting input of which is connected through resistors 79 and 80 to the input terminal 70. The amplifier 78 has a feedback resistor 81 connected to its inverting input.

The circuits connected to the outputs of the comparators 72 and 73 which are the same as that connected to the output of the comparator 71 also apply current to the non-inverting input of the amplifier 78 whenever the input voltage lies above the respective midway voltage levels. The amplifier 78 acts as a subtractor to produce an output voltage equal to the difference between the input signal and the nearest of the quantizing level voltages, because the current fed to the non-inverting input of the amplifier 78 when none of comparators 71, 72 and 73 is producing a positive output voltage represents the lowest quantizing level, and this current is progressively increased to represent the higher quantizing levels in turn as the comparators 73, 72 and 71 produce positive output voltages with increase in the input voltage. A transistor 82 produces at its collector the current representing the lowest quantizing level. The output voltages of the comparators 71, 72 and 73 can be used to provide a digital output for feeding to the regenerator 55 (FIG. 3), or a current proportional to a quantized signal can be derived from the conductor 76.

FIG. 6 shows in detail the sampler 51 of FIG. 3. The error signal from the amplifier 50 (FIG. 3) which corresponds to the amplifier 78 (FIG. 5) enters the circuit of FIG. 6 at terminal 90 and is applied through a resistor 91 to the inverting input of an amplifier 92, which has a negative feedback resistor 93. The output voltage of the amplifier 92, which is a linearly amplified version of the error signal is applied as one input to an analogue multiplier 94 constituted by a Motorola integrated circuit MC 1494L. The second input to the multiplier 94 is connected to the collector of a transistor 95, the conductivity of which is controlled by a transistor 96. When a sampling pulse is applied to a terminal 97 the transistors 95 and 96 are caused to conduct so that a temperature-compensated fixed reference voltage (+1 volt) present applied to the second input of the multiplier 94. The output voltage of the multiplier 94 representing the product of the two input voltages is generated on conductor 98, which is connected through resistor 100 to an input of an amplifier 102 which has a negative feedback resistor 103 connected to the output terminal 104 for the circuit.

When no sampling pulse is applied to the terminal 97 the voltage at the second input to the multiplier 94 is zero, so that the output voltage from the multiplier 94 representing the product must be zero. Potentiometers 105 and 106 are provided connected to the multiplier 94 for adjustment to ensure that the multiplier is correctly balanced and its output d.c. voltage is offset in amplifier 102 by potentionmeter 107. When a sampling pulse is presnet the output voltage from the circuit represents the error voltage multiplied by a fixed known quantity.

Figure 7:
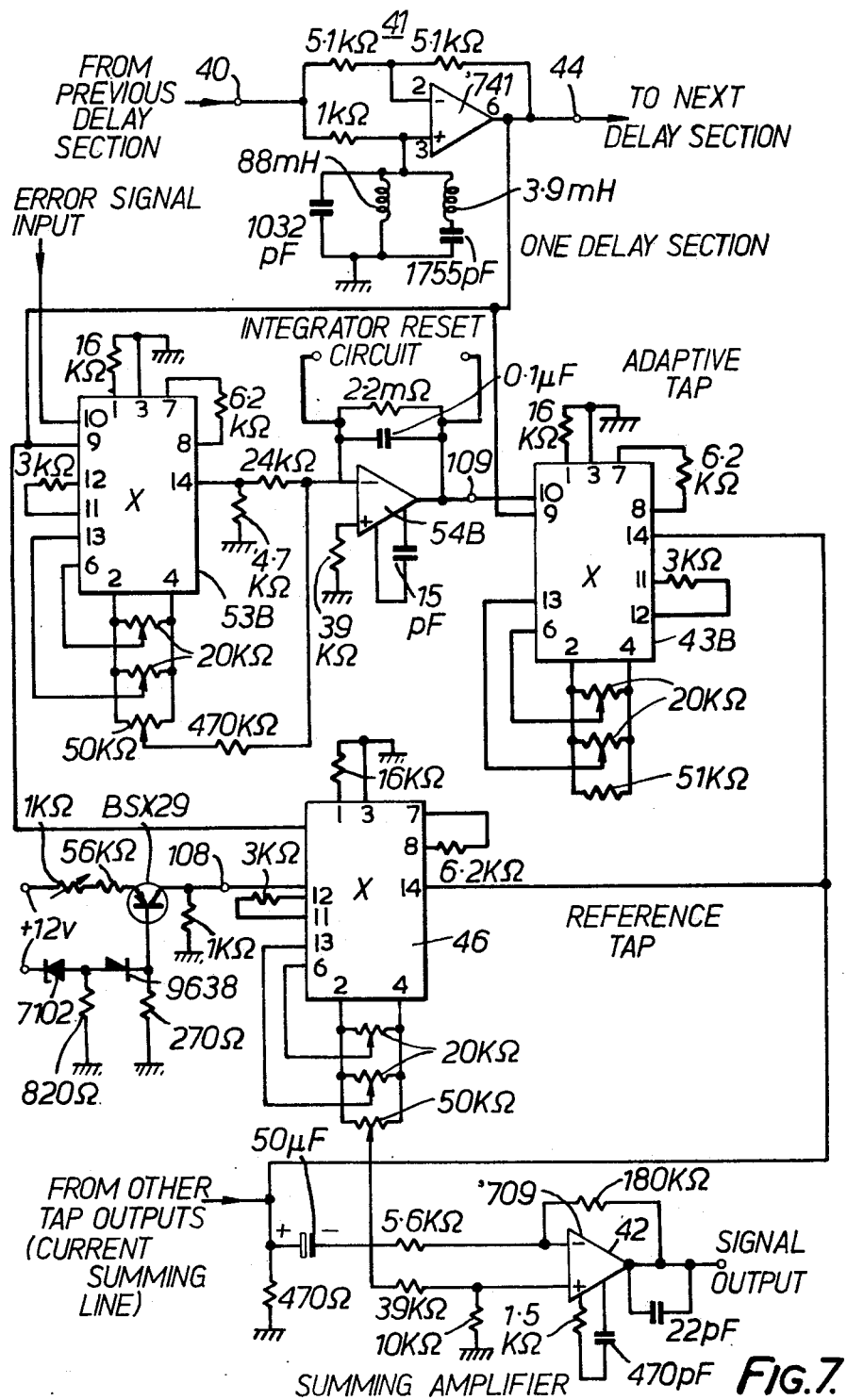

FIG. 7 shows a typical implementation of a semiactive delay element 41 which could be used as one stage of the delay line, an adaptive tap consisting of a correlator 53B and 54B and a attenuator 43, a reference tap 46 and a summing amplifier 42, the whole of which (except for the summing amplifier 42) could form the reference +1 tap shown in FIG. 3.

The uncorrected signal at a point 44 is connected to the input of the reference tap 46, the correlator 53B of the adaptive section of the tap and the attenuator 43B. A sampled error signal 104 from the amplifier 102 is connected to the other port of the correlator, the output 109 of which is connected to the control input of the attenuator 43B which, in this example, is a four-quadrant multiplier. The attenuator output signal magnitude and polarity depend on the correlator output control voltage.

A reference tap consisting of a fixed-gain circuit may be implemented by using a four-quadrant multiplier 46 with the signal at the point 44 on one port and a fixed control voltage set up a point 108 on the other port. A fixed positive control voltage would be used to produce the reference +1 main tap 46 while a fixed negative control voltage would be used to produce the reference −1 main tap 47 (FIG. 3).

The circuit components connected to the taps shown in FIG. 3 and indicated by the references 43A,C&E 53A,C&E and 54A,C&E may be similar to the circuit components 53B, 54B and 43B shown in more detail in FIG. 7. All the outputs of the tap circuits (43A to E, 46 and 47), adaptive and fixed, are summed in the circuit 42. The circuit 42 may also be used to amplify the signal to a level suitable for the quantizer.

Furthermore, items 48 and 49 in FIG. 3 together form a 7-level quantizer and could be replaced by any suitable quantizer circuit designed to recognize the appropriate number of levels at its input (7 levels in the example) and to provide an error signal indicating the difference between the actual input signal level and its expected value.

In the foregoing the use of the invention has been described in conjunction with a vestigial-sideband-suppressed-carrier amplitude modulation transmission method. It is evident, however, that the invention could equally well be used with any linear modulation process. For example, it could be applied to double-sideband amplitude modulation systems or to each channel of a quadrature amplitude modulation system; or it could be used directly as a baseband transmission method.

In alternative embodiments of the invention, the delay elements 41A, 41B, etc. in FIG. 3 could be implemented by sample-and-hold or follow-and-hold circuits and alternative multiplying elements (43, 53) and integrating elements (54) could be employed. Moreover, although the example described uses a linear algorithm to control the coefficients of the waveform corrector tap attenuators, other algorithms employing only the polarity of the error signal and/or that of the signal on the delay line, could alternatively be employed. In yet another embodiment, the coefficients of those tap attenuators correcting trailing echoes, 43E onwards, could be controlled by previously made decisions using a decision feedback algorithm.

Any of the adaptive or automatic waveform corrector algorithms referred to can be implemented by entirely or partially digital means and the invention could equally well be implemented with any of these.

Although the invention has been described with reference to specific embodiments it will be appreciated that it is not limited to these embodiments. In particular, multiple response modes other than (1,0,−1) used above may be employed and may have advantages for certain applications, and the modes may use more than two responses and may be arranged to operate with signals having any radix ($m$) and with a number of levels at the input to the quantizer which may be other than $2m-1$.

We claim:

1. A digital data transmission system having at least one transmitter and at least one receiver, in which system signal elements are transmitted from the transmitter to the receiver successively at regularly spaced instants and each signal element is arranged to produce, during transmission by the system, output elements at more than one discrete instant spaced apart by an integral number of the time intervals between the instants of adjacent signal elements, so that output elements from different signal elements are produced simultaneously and superimposed, wherein the or each receiver includes additive combining means with a plurality of inputs for signal elements, a plurality of signal paths having gains related by small integers and connected from a common point to the inputs of the additive combining means, each path transmitting to the additive combining means all signal elements appearing at the common point, at least one signal path including delay means so that the different signal paths respectively impose fixed delays on signals transmitted through them which differ by integral numbers of the time intervals between the instants of adjacent signal elements, and means for applying received signal elements to the common point and thence to the additive combining means through the plurality of signal paths in parallel, thereby to produce from the additive combining means on output signal having a greater number of levels than the received signal elements.

2. A system according to claim 1 wherein prior to transmission the signal elements are derived from digital data to be transmitted by a precoding operation dependent on the number and type of output elements spaced apart by an integral number of the time intervals which are produced from each signal element, and are superimposed during transmission.

3. A system according to claim 2 wherein two output elements are produced in response to each signal element and the precoding operation is such that an output signal resulting from the superimposition of the output elements is congruent (modulo $n$) to the signal element before precoding, where $n$ is the number of discrete signal levels possible for each signal element.

4. A system according to claim 1 wherein the signal elements are delayed and additively combined to produce the output signal after demodulation in the or each receiver.

5. A system according to claim 1 wherein the plurality of signal paths comprises a transversal filter including a delay line to an end of which the received signal elements are applied and having tappings spaced at unit time intervals each equal to the time interval between the instants of adjacent signal elements and fixed circuits connected to the tappings having gains corresponding to a desired multiple response characteristic defining the magnitudes and polarities of the output elements to be produced in response to a single signal element taking into account the time instants of the tappings relative to the end of the delay line to which the signal elements are applied, the outputs of the fixed circuits being connected to the inputs of the additive combining means.

6. A system according to claim 5 wherein the transversal filter includes adaptive circuits, additional to the fixed circuits which correspond to the desired multiple response characteristic, connected to tappings of the delay line, the adpative circuits serving to compensate for distortions of the signal elements arising during transmission through the system.

7. A system according to claim 6 wherein each adaptive circuit includes a first multiplier, an integrator circuit for recording the sum of the product from the first multiplier, and a second multiplier having as a first input the product from the integrator circuit, the tapping of the delay line associated with the particular adaptive circuit being connected to a first input of the first multiplier and a second input of the second multiplier and the second input of the first multiplier being connected to receive a signal representing the departure from predetermined reference levels of the superimposed output elements.

8. A receiver for digital data including a network through which incoming signal elements are passed, which network includes additive combining means with a plurality of inputs for signal elements, a plurality of signal paths having gains related by small integers and connected from a common point to the additive combining means, each path transmitting to the additive combining means all signal elements appearing at the common point, at least one signal path including delay means so that the different signal paths respectively imposed fixed delays on signals transmitted through them which differ by integral numbers of the time intervals between the instants of adjacent signal elements, and means for applying received signal elements to the common point and thence to the additive combining means through the plurality of signal paths in parallel, thereby to produce from the additive combining means an output signal having a greater number of levels than the received signal elements.

9. A receiver according to claim 8 wherein the network is a transversal filter including a delay line to an end of which the signal elements are applied and having tappings spaced at unit time intervals each equal to the interval between the instants of adjacent signal elements and fixed circuits connected to the tappings having gains corresponding to a desired multiple response characteristic defining the magnitudes and polarities of the output elements to be produced in response to a single signal element taking into account the time instants of the tappings relative to the end of the delay line to which the signal elements are applied.

10. A receiver according to claim 9 wherein the transversal filter includes adaptive circuits, additional to the fixed circuits which correspond to the desired multiple response characteristic, connected to tappings of the delay line, the adaptive circuits serving to compensate for distortions of the signal elements arising during transmission to the receiver.

11. A receiver according to claim 10 wherein each adaptive circuit includes a first multiplier, an integrator circuit for recording the sum of the product from the first multiplier, and a second multiplier having as a first input the product from the integrator circuit, the tapping of the delay line associated with the particular adaptive circuit being connected to a first input of the first multiplier and a second input of the second multiplier and the second input of the first multiplier being connected to receive a signal representing the departure from predetermined reference levels of the superimposed output elements.

* * * * *